US 9,171,246 B2

(12) United States Patent
Braun

(10) Patent No.: US 9,171,246 B2
(45) Date of Patent: Oct. 27, 2015

(54) SYSTEM, METHODS, APPARATUSES, AND COMPUTER PROGRAM PRODUCTS FOR DETECTING THAT AN OBJECT HAS BEEN ACCESSED

(75) Inventor: Patrick J Braun, Pittsburgh, PA (US)

(73) Assignee: Aesynt Incorporated, Cranberry, PA (US)

( * ) Notice: Subject to any disclaimer, the term of this patent is extended or adjusted under 35 U.S.C. 154(b) by 286 days.

(21) Appl. No.: 13/537,596

(22) Filed: Jun. 29, 2012

(65) Prior Publication Data

US 2014/0002245 A1 Jan. 2, 2014

(51) Int. Cl.
*H04Q 5/22* (2006.01)
*G06K 19/077* (2006.01)
*G06K 17/00* (2006.01)

(52) U.S. Cl.
CPC .... *G06K 19/07798* (2013.01); *G06K 2017/009* (2013.01); *G06K 2017/0045* (2013.01); *G06K 2017/0064* (2013.01)

(58) Field of Classification Search
CPC ................... G06K 19/07749; G06K 19/0723; G06K 2017/009
USPC ............................................ 340/10.4, 539.23
See application file for complete search history.

(56) References Cited

U.S. PATENT DOCUMENTS

| | | | |
|---|---|---|---|
| 4,717,042 A | 1/1988 | McLaughlin | |
| 4,785,969 A | 11/1988 | McLaughlin | |
| 4,847,764 A | 7/1989 | Halvorson | |
| 5,003,296 A | 3/1991 | Lee | |
| 5,014,875 A | 5/1991 | McLaughlin et al. | |
| 5,190,185 A | 3/1993 | Blechl | |
| 5,314,243 A | 5/1994 | McDonald et al. | |
| 5,346,297 A | 9/1994 | Colson, Jr. et al. | |
| 5,377,864 A | 1/1995 | Blechl et al. | |
| 5,405,048 A | 4/1995 | Rogers et al. | |
| 5,431,299 A | 7/1995 | Brewer et al. | |
| 5,460,294 A | 10/1995 | Williams | |
| 5,468,110 A | 11/1995 | McDonald et al. | |
| 5,480,062 A | 1/1996 | Rogers et al. | |
| 5,520,450 A | 5/1996 | Colson, Jr. et al. | |
| 5,564,803 A | 10/1996 | McDonald et al. | |
| 5,593,267 A | 1/1997 | McDonald et al. | |

(Continued)

OTHER PUBLICATIONS

SP Central; "*Pharmacy Management System & Workflow System;*" ScriptPro®, Pharmacy Automation; www.scripto.com; Mar. 30, 2009 http://www.scriptpro.com/products/SPC_PMS_Workflow_brochure_single_pgs.pdf.

For Health Technologies, Inc.; "*IntelliFill I.V.—Automates the Preparation of Small Volume I.V. Medication*," http://www.fhtinc.com/pharmacy.html; Mar. 30, 2009.

(Continued)

*Primary Examiner* — Brian Zimmerman
*Assistant Examiner* — Thomas McCormack
(74) *Attorney, Agent, or Firm* — Alston & Bird LLP

(57) ABSTRACT

A system, method, apparatus, and computer program product are provided for detecting that an object has been accessed. A system may include a first surface carrying a first signaling tag and a second surface carrying a second signaling tag. The first and second signaling tags may be positioned such that when the second surface is in a first position, the first signaling tag and the second signaling tag are sufficiently proximate to each other such that a coupling between the first signaling tag and the second signaling tag results in a first signal state being emitted by at least one of the signaling tags. When the second surface is transitioned from the first position to a second position, a decoupling between the first signaling tag and the second signaling tag may in a second signal state being emitted by at least one of the signaling tags.

23 Claims, 8 Drawing Sheets

(56) References Cited

U.S. PATENT DOCUMENTS

| | | |
|---|---|---|
| 5,661,978 A | 9/1997 | Holmes et al. |
| D384,578 S | 10/1997 | Wangu et al. |
| 5,713,485 A | 2/1998 | Liff et al. |
| 5,716,114 A | 2/1998 | Holmes et al. |
| 5,745,366 A | 4/1998 | Higham et al. |
| 5,761,877 A | 6/1998 | Quandt |
| 5,797,515 A | 8/1998 | Liff et al. |
| 5,805,456 A | 9/1998 | Higham et al. |
| 5,842,976 A | 12/1998 | Williamson |
| 5,878,885 A | 3/1999 | Wangu et al. |
| 5,880,443 A | 3/1999 | McDonald et al. |
| 5,883,806 A | 3/1999 | Meador et al. |
| 5,893,697 A | 4/1999 | Zini et al. |
| 5,905,653 A | 5/1999 | Higham et al. |
| 5,912,818 A | 6/1999 | McGrady et al. |
| 5,927,540 A | 7/1999 | Godlewski |
| 5,940,306 A | 8/1999 | Gardner et al. |
| 5,971,593 A | 10/1999 | McGrady |
| 6,003,006 A | 12/1999 | Colella et al. |
| 6,011,999 A | 1/2000 | Holmes |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,109,774 A | 8/2000 | Holmes et al. |
| 6,112,502 A | 9/2000 | Frederick et al. |
| 6,116,461 A | 9/2000 | Broadfield et al. |
| 6,151,536 A | 11/2000 | Arnold et al. |
| 6,170,230 B1 | 1/2001 | Chudy et al. |
| 6,176,392 B1 | 1/2001 | William et al. |
| 6,189,727 B1 | 2/2001 | Shoenfeld |
| 6,223,934 B1 | 5/2001 | Shoenfeld |
| 6,256,967 B1 | 7/2001 | Hebron et al. |
| 6,283,322 B1 | 9/2001 | Liff et al. |
| 6,285,285 B1 | 9/2001 | Mongrenier |
| 6,289,656 B1 | 9/2001 | Wangu et al. |
| 6,337,631 B1 | 1/2002 | Pai et al. |
| 6,338,007 B1 | 1/2002 | Broadfield et al. |
| 6,339,732 B1 | 1/2002 | Phoon et al. |
| 6,361,263 B1 | 3/2002 | Dewey et al. |
| 6,370,841 B1 | 4/2002 | Chudy et al. |
| 6,449,927 B2 | 9/2002 | Hebron et al. |
| 6,471,089 B2 | 10/2002 | Liff et al. |
| 6,497,342 B2 | 12/2002 | Zhang et al. |
| 6,499,270 B2 | 12/2002 | Peroni et al. |
| 6,532,399 B2 | 3/2003 | Mase |
| 6,564,121 B1 | 5/2003 | Wallace et al. |
| 6,581,798 B2 | 6/2003 | Liff et al. |
| 6,609,047 B1 | 8/2003 | Lipps |
| 6,611,733 B1 | 8/2003 | De La Huerga |
| 6,625,952 B1 | 9/2003 | Chudy et al. |
| 6,640,159 B2 | 10/2003 | Holmes et al. |
| 6,650,964 B2 | 11/2003 | Spano, Jr. et al. |
| 6,671,579 B2 | 12/2003 | Spano, Jr. et al. |
| 6,681,149 B2 | 1/2004 | William et al. |
| 6,690,280 B2 | 2/2004 | Citrenbaum et al. |
| 6,742,671 B2 | 6/2004 | Hebron et al. |
| 6,755,931 B2 | 6/2004 | Vollm et al. |
| 6,760,643 B2 | 7/2004 | Lipps |
| 6,776,304 B2 | 8/2004 | Liff et al. |
| 6,785,589 B2 | 8/2004 | Eggenberger et al. |
| 6,790,198 B1 | 9/2004 | White et al. |
| 6,814,254 B2 | 11/2004 | Liff et al. |
| 6,814,255 B2 | 11/2004 | Liff et al. |
| 6,847,861 B2 | 1/2005 | Lunak et al. |
| 6,874,684 B1 | 4/2005 | Denenberg et al. |
| 6,892,780 B2 | 5/2005 | Vollm et al. |
| 6,895,304 B2 | 5/2005 | Spano, Jr. et al. |
| 6,963,791 B1 | 11/2005 | Frederick et al. |
| 6,975,922 B2 | 12/2005 | Duncan et al. |
| 6,985,797 B2 | 1/2006 | Spano, Jr. et al. |
| 6,989,796 B2 | 1/2006 | Rahim |
| 6,996,455 B2 | 2/2006 | Eggenberger et al. |
| 7,010,389 B2 | 3/2006 | Lunak et al. |
| 7,014,063 B2 | 3/2006 | Shows et al. |
| 7,016,766 B2 | 3/2006 | William et al. |
| 7,040,504 B2 | 5/2006 | Broadfield et al. |
| 7,052,097 B2 | 5/2006 | Meek, Jr. et al. |
| 7,072,737 B2 | 7/2006 | Lunak et al. |
| 7,072,855 B1 | 7/2006 | Godlewski et al. |
| 7,077,286 B2 | 7/2006 | Shows et al. |
| 7,085,621 B2 | 8/2006 | Spano, Jr. et al. |
| 7,092,796 B2 | 8/2006 | Vanderveen |
| 7,093,755 B2 | 8/2006 | Jordan et al. |
| 7,100,792 B2 | 9/2006 | Hunter et al. |
| 7,103,419 B2 | 9/2006 | Engleson et al. |
| 7,111,780 B2 | 9/2006 | Broussard et al. |
| 7,139,639 B2 | 11/2006 | Broussard et al. |
| 7,150,724 B2 | 12/2006 | Morris et al. |
| 7,171,277 B2 | 1/2007 | Engleson et al. |
| 7,218,231 B2 | 5/2007 | Higham |
| 7,228,198 B2 | 6/2007 | Vollm et al. |
| 7,249,688 B2 | 7/2007 | Hunter et al. |
| 7,348,884 B2 | 3/2008 | Higham |
| 7,417,729 B2 | 8/2008 | Greenwald |
| 7,419,133 B2 | 9/2008 | Clarke et al. |
| 7,426,425 B2 | 9/2008 | Meek, Jr. et al. |
| 7,554,449 B2 | 6/2009 | Higham |
| 7,571,024 B2 | 8/2009 | Duncan et al. |
| 7,588,167 B2 | 9/2009 | Hunter et al. |
| 7,596,427 B1 | 9/2009 | Frederick et al. |
| 7,783,383 B2 | 8/2010 | Eliuk et al. |
| 7,821,401 B2 | 10/2010 | Martin et al. |
| 7,956,751 B2 | 6/2011 | Lenevez |
| 7,982,612 B2 | 7/2011 | Braun |
| 8,094,028 B2 | 1/2012 | Braun et al. |
| 2002/0188259 A1 | 12/2002 | Hickle et al. |
| 2003/0117281 A1 | 6/2003 | Sriharto et al. |
| 2004/0061994 A1 | 4/2004 | Kerr et al. |
| 2005/0088305 A1 | 4/2005 | Greene et al. |
| 2005/0258963 A1* | 11/2005 | Rodriguez ........... G03G 1/1878 340/572.1 |
| 2006/0102718 A1 | 5/2006 | Kajino et al. |
| 2006/0108252 A1 | 5/2006 | Lax |
| 2006/0214864 A1 | 9/2006 | Rahim |
| 2006/0244599 A1 | 11/2006 | Taylor et al. |
| 2006/0264778 A1 | 11/2006 | Lim et al. |
| 2006/0289650 A1 | 12/2006 | Taylor et al. |
| 2007/0027577 A1 | 2/2007 | Lunak et al. |
| 2007/0229266 A1 | 10/2007 | Gibson |
| 2008/0051937 A1 | 2/2008 | Khan et al. |
| 2008/0195246 A1 | 8/2008 | Tribble et al. |
| 2008/0195416 A1 | 8/2008 | Tribble et al. |
| 2009/0043253 A1 | 2/2009 | Podaima |
| 2009/0152363 A1* | 6/2009 | Kim ............................. 235/492 |
| 2009/0322545 A1 | 12/2009 | Gibson et al. |
| 2010/0164710 A1* | 7/2010 | Chung et al. ............. 340/539.1 |
| 2010/0214106 A1* | 8/2010 | Braun ......................... 340/618 |
| 2010/0245056 A1* | 9/2010 | Braun et al. ............. 340/10.42 |
| 2010/0265068 A1 | 10/2010 | Brackman et al. |
| 2011/0037567 A1* | 2/2011 | Knadle et al. ............. 340/10.1 |
| 2011/0199212 A1* | 8/2011 | Matityaho et al. ........ 340/572.7 |
| 2013/0154809 A1* | 6/2013 | Subramanian et al. .... 340/10.42 |

OTHER PUBLICATIONS

For Health Technologies, Inc.; Intelliflow™ Rx, I.V. Workflow Manager, http://www.fhtinc.com/FHZS_files/Blueprint_for_Your_I.V._Room%27s_Future.pdf, Mar. 30, 2009.

Valimed Medication Validation System; www.ValiMed.com; http://www.cdexinc.com/pages/valimedbrochure.pdf, Mar. 30, 2009.

Carmel Pharma AB; PhaSeal® Protects Those Who Care™; Göteborg, Sweden; www.carmelpharma.com Mar. 30, 2009.

Notice of Allowance for U.S. Appl. No. 12/342,749 dated Sep. 7, 2011.

Office Action for U.S. Appl. No. 12/342,749 dated Dec. 9, 2010.

Office Action for U.S. Appl. No. 12/342,749 dated May 11, 2011.

Notice of Allowance for U.S. Appl. No. 12/389,842 dated Mar. 15, 2011.

Response to Amendment for U.S. Appl. No. 12/389,842 dated May 3, 2011.

* cited by examiner

SYSTEM, METHODS, APPARATUSES, AND COMPUTER PROGRAM PRODUCTS FOR DETECTING THAT AN OBJECT HAS BEEN ACCESSED

TECHNOLOGICAL FIELD

Embodiments of the present invention relate generally to tracking access to items and, more particularly, relate to systems, methods, apparatuses, and computer program products for detecting that an object has been accessed.

BACKGROUND

In many instances, access to objects may be controlled, such as for purposes of monitoring inventory, preventing unauthorized access to objects, and/or the like. For example, in the case of valuable objects and controlled items, such as medical items, it may be important to track access to objects to reduce the chance that an unauthorized party has accessed an object and/or to facilitate inventory tracking. Accordingly, efforts are ongoing to develop improved systems to enable detection of access to an object.

BRIEF SUMMARY OF SOME EXAMPLES OF THE INVENTION

Systems, methods, apparatuses, and computer program products are herein provided for detecting that an object has been accessed. Systems, methods, and apparatuses in accordance with various embodiments provide several advantages to computing devices and organizations charged with managing inventory and/or tracking access to objects. In this regard, some example embodiments provide a system for detecting that an object has been accessed. More particularly, some example embodiments utilize a change in state of a signal emitted by one or more signaling tags resulting from a transition of a surface carrying a signaling tag from a first position to a second position to detect that an object has been accessed.

For example, in some example embodiments, a first signaling tag may be carried by a surface of a receptacle and a second signaling tag may be carried by a surface of a closure for the receptacle. When the closure is opened, a detectable change in state of a signal emitted by the first signaling tag and/or the second signaling tag may result such that it may be detected that the receptacle has been accessed. Accordingly, it may be determined that an item that may be stored in the receptacle has been accessed.

As another example, in some example embodiments, a first signaling tag may be carried by a surface of an object and a second signaling tag may be carried by a surface on which the object may rest. If the object is removed from the surface, a detectable change in state of a signal emitted by the first signaling tag and/or the second signaling tag may result such that it may be detected that the object has been accessed.

In a first example embodiment, a method for detecting that an object has been accessed is provided. The method may comprise detecting a change in state of a signal emitted by at least one of a first signaling tag carried by a first surface or a second signaling tag carried by a second surface. The change in state may result from the second surface being transitioned from a first position to a second position. The first signaling tag may be positioned on the first surface and the second signaling tag may be positioned on the second surface such that when the second surface is in the first position, the first signaling tag and the second signaling tag are sufficiently proximate to each other such that a coupling occurs between the first signaling tag and the second signaling tag resulting in a first signal state being emitted by at least one of the first signaling tag or the second signaling tag. When the second surface is transitioned from the first position to the second position, a decoupling between the first signaling tag and the second signaling tag may result in a second signal state being emitted by at least one of the first signaling tag or the second signaling tag. The method may further comprise, in response to detecting the change in state, determining that an object associated with at least one of the first signaling tag or the second signaling tag has been accessed.

In another example embodiment, an apparatus for detecting that an object has been accessed is provided. The apparatus of this example embodiment may comprise at least one processor. The at least one processor may be configured to cause the apparatus of this example embodiment to detect a change in state of a signal emitted by at least one of a first signaling tag carried by a first surface or a second signaling tag carried by a second surface. The change in state may result from the second surface being transitioned from a first position to a second position. The first signaling tag may be positioned on the first surface and the second signaling tag may be positioned on the second surface such that when the second surface is in the first position, the first signaling tag and the second signaling tag are sufficiently proximate to each other such that a coupling occurs between the first signaling tag and the second signaling tag resulting in a first signal state being emitted by at least one of the first signaling tag or the second signaling tag. When the second surface is transitioned from the first position to the second position, a decoupling between the first signaling tag and the second signaling tag may result in a second signal state being emitted by at least one of the first signaling tag or the second signaling tag. The at least one processor may be further configured to cause the apparatus of this example embodiment, in response to detecting the change in state, to determine that an object associated with at least one of the first signaling tag or the second signaling tag has been accessed.

In a further example embodiment, a computer program product for detecting that an object has been accessed is provided. The computer program product of this example embodiment includes at least one computer-readable storage medium having computer-readable program code portions stored therein. The computer-readable program code portions of this example embodiment may comprise a program code portion configured to detect a change in state of a signal emitted by at least one of a first signaling tag carried by a first surface or a second signaling tag carried by a second surface. The change in state may result from the second surface being transitioned from a first position to a second position. The first signaling tag may be positioned on the first surface and the second signaling tag may be positioned on the second surface such that when the second surface is in the first position, the first signaling tag and the second signaling tag are sufficiently proximate to each other such that a coupling occurs between the first signaling tag and the second signaling tag resulting in a first signal state being emitted by at least one of the first signaling tag or the second signaling tag. When the second surface is transitioned from the first position to the second position, a decoupling between the first signaling tag and the second signaling tag may result in a second signal state being emitted by at least one of the first signaling tag or the second signaling tag. The computer-readable program code portions of this example embodiment may further comprise a program code portion configured, in response to detecting the change in state, to determine that an object associated with at least one of the first signaling tag or the second signaling tag has been accessed.

In yet another example embodiment, a system for facilitating detection of an object being accessed is provided. The system of this example embodiment may comprise a first surface, a second surface, a first signaling tag carried by the first surface, and a second signaling tag carried by the second surface. The first signaling tag may be positioned on the first surface and the second signaling tag may be positioned on the second surface such that when the second surface is in a first position, the first signaling tag and the second signaling tag are sufficiently proximate to each other such that a coupling occurs between the first signaling tag and the second signaling tag resulting in a first signal state being emitted by at least one of the first signaling tag or the second signaling tag. When the second surface is transitioned from the first position to a second position, a decoupling between the first signaling tag and the second signaling tag may result in a second signal state being emitted by at least one of the first signaling tag or the second signaling tag.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
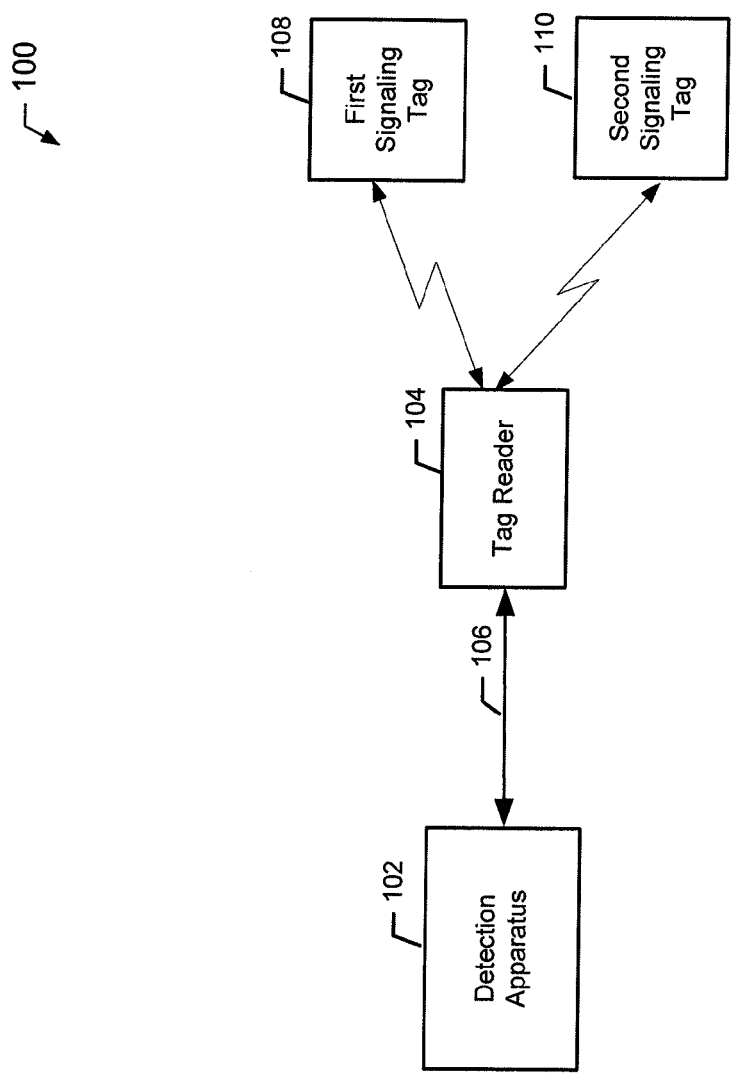
FIG. 1 illustrates a system for detecting that an object has been accessed according to some example embodiments.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from or send data to another computing device, it will be appreciated that the data may be received directly from or sent directly to the another computing device, or may be received/sent indirectly via one or more intermediary computing devices, such as, for example, one or more servers, relays, routers, network access points, and/or the like.

FIG. 1 illustrates a system 100 for detecting that an object has been accessed according to some example embodiments. It will be appreciated that the apparatus 102, as well as the illustrations in other figures, are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for detecting that an object has been accessed, numerous other configurations may also be used to implement embodiments of the present invention.

In some example embodiments, the system 100 may comprise a detection apparatus 102. The detection apparatus may comprise any computing device or plurality of computing devices configured to interface with a tag reader 104 via a communications link 106 to receive an indication of a signal emitted by a signaling tag, such as the first signaling tag 108 and/or second signaling tag 110, and to detect a change in state of a signal emitted by a signaling tag based at least in part on the indication received from the tag reader 104. By way of non-limiting example, the detection apparatus 102 may comprise a desktop computer, laptop computer, mobile computing device, server, embedded computing device, and/or the like.

In some example embodiments, the first signaling tag 108 and/or second signaling tag 110 may comprise radio frequency (RF) tags. Accordingly, the description herein of some embodiments of the invention refers to a signaling tag (e.g., the signaling tags 108 and 110) as RF tags for purposes of example to describe a radio frequency signal as one type of signal that may be emitted by a signaling tag. It will be appreciated, however, that a signaling tag, such as the signaling tags 108 and 110, may be configured to emit detectable signals other than radio frequency, such as, for example, ultrasound signals, optical signals, electrical current, electrical voltage, an electrical field, a magnetic field, and/or the like. It will thus be appreciated that wherever reference is made to RF tags herein, it is merely one example of a signaling tag and accordingly other types of signaling tags may be substituted for RF tags.

It will be further appreciated that in some example embodiments a signaling tag, such as the first signaling tag 108 or second signaling tag 110, may comprise either an active tag or a passive tag (e.g., an active or passive RF tag). Accordingly, a reader used to monitor a state of a signal emitted by the signaling tag may be configured to passively monitor the signal state or to actively interrogate the signaling tag. As such, any signal emitted by a signaling tag may be emitted in response to being interrogated by the tag reader 104, if the signaling tag is embodied as a passive tag.

The tag reader 104 may be embodied as any signaling tag reader configured to read a signal that may be emitted by a signaling tag(s) (e.g., the first signaling tag 108, second signaling tag 110, and/or other signaling tag) such that a change in state of the signal may be detected by the detection apparatus 102. As an example, the tag reader 104 may, for example, comprise an RF tag reader in embodiments in which one or more of the first signaling tag 108 or second signaling tag 110 comprise RF tags. Depending on embodiments of the first signaling tag 108 and second signaling tag 110, the tag reader 104 may be configured to passively read an emitted signal (e.g., for an active RF tag) and/or to actively interrogate the signaling tag 16 (e.g., for a passive RF tag). The tag reader 104 may be located anywhere within sufficient proximity to detect a change in state of a signal emitted by one or more of the first signaling tag 108 or second signaling tag 110. The tag reader 104 may, for example, be positioned at a location at which an object to be monitored may be accessed. For example, the tag reader 104 may be positioned at a dispensary where health care items (e.g., medical supplies, drugs, and/or the like) may be maintained in one or more receptacles so that access to the health care items may be monitored. As another example, the tag reader 104 may be positioned at a station along a conveyor system on which an object may be moved. In this regard, if the object is accessed at the station, the tag reader 104 of such example embodiments may be configured to enable detection that the object has been accessed.

Although referred to as a tag reader, it will be appreciated that the tag reader 104 may comprise a system comprising a plurality of components. For example, the tag reader 104 may comprise a tag reader component connected to one or more antennas configured to receive a signal emitted by a signaling tag and transmit the signal to the tag reader component so that the tag reader component may read the signal.

In some embodiments, the communications link 106 comprises a direct wired connection or wireless communications link between the tag reader 104 and detection apparatus 102. Additionally or alternatively, in some example embodiments, the communications link 106 comprises a network (e.g., a wireline network, wireless network, or some combination thereof) through which the tag reader 104 and detection apparatus 102 may be interfaced.

Figure 2:
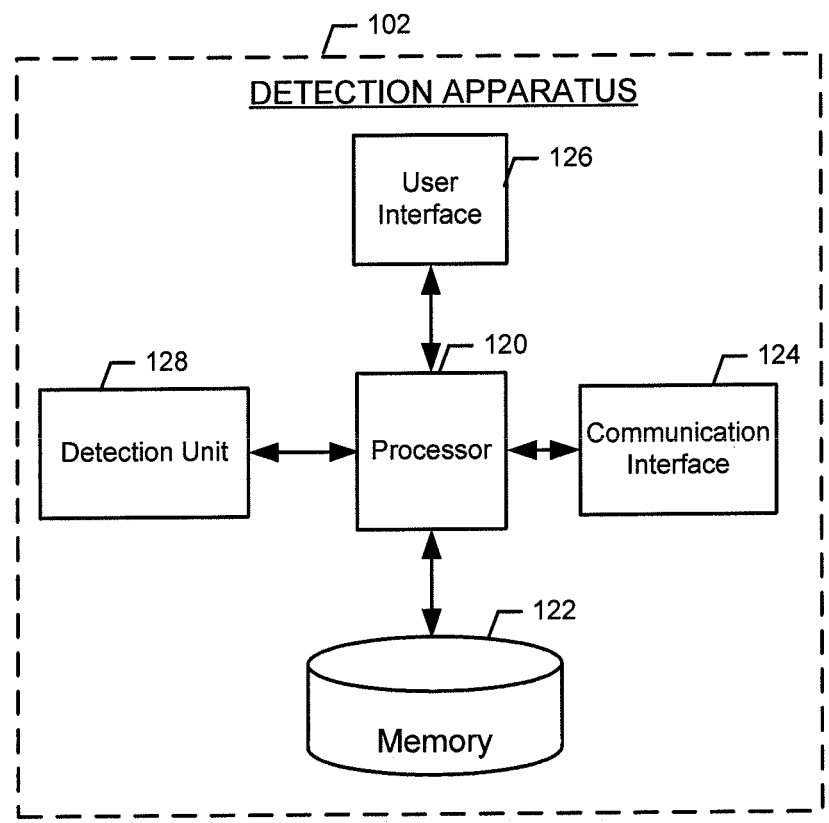
FIG. 2 illustrates a block diagram of a detection apparatus according to some example embodiments.

Referring now to FIG. 2, FIG. 2 illustrates a block diagram of a detection apparatus 102 according to some example embodiments. In some example embodiments, the detection apparatus 102 includes various means for performing the various functions described herein. These means may include, for example, one or more of a processor 120, memory 122, communication interface 124, user interface 126, or detection unit 128 for performing the various functions herein described. The means of the apparatus 102 as described herein may be embodied as, for example, circuitry, hardware elements (e.g., a suitably programmed processor, combinational logic circuit, and/or the like), a computer program product comprising a computer-readable medium (e.g. memory 122) storing computer-readable program instructions (e.g., software or firmware) that are executable by a suitably configured processing device (e.g., the processor 120), or some combination thereof.

The processor 120 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 120 may comprise a plurality of processors. The plurality of processors may be embodied on a single computing device or may be distributed across a plurality of computing devices collectively configured to function as the detection apparatus 102. The plurality of processors may be in operative communication with each other and may be collectively configured to perform one or more functionalities of the detection apparatus 102 as described herein. In some embodiments, the processor 120 may be configured to execute instructions stored in the memory 122 or otherwise accessible to the processor 120. These instructions, when executed by the processor 120, may cause the detection apparatus 102 to perform one or more of the functionalities of the apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 2 as a single memory, the memory 122 may comprise a plurality of memories. The plurality of memories may be embodied on a single computing device or distributed across a plurality of computing devices. The memory 122 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 122 may comprise any non-transitory computer readable storage medium. The memory 122 may be configured to store information, data, applications, instructions, and/or the like for enabling the detection apparatus 102 to carry out various functions in accordance with example embodiments of the present invention. For example, in some example embodiments, the memory 122 is configured to buffer input data for processing by the processor 120. Additionally or alternatively, in some example embodiments, the memory 122 is configured to store program instructions for execution by the processor 120. The memory 122 may store information in the form of static and/or dynamic information. This stored information may be stored and/or used by the detection unit 128 during the course of performing its functionalities.

In some example embodiments, the detection apparatus 102 may include a communication interface(s), such as the communication interface 124. In embodiments including a communication interface, the communication interface 124 may be embodied as any device or means embodied in circuitry, hardware, a computer program product comprising a computer readable medium (e.g., the memory 122) storing computer readable program instructions executed by a processing device (e.g., the processor 120), or a combination thereof that is configured to receive and/or transmit data from/to another device with which the detection apparatus 102 may be in communication. In some example embodiments, the communication interface 124 is at least partially embodied as or otherwise controlled by the processor 120. In this regard, the communication interface 124 may be in communication with the processor 120, such as via a bus. The communication interface 124 may additionally be in communication with the memory 122, user interface 126, and/or detection unit 128, such as via a bus. The communication interface 124 may include, for example, an antenna, a transmitter, a receiver, a transceiver and/or supporting hardware or software for enabling communications with another computing device. The communication interface 124 may be configured to receive and/or transmit data using any protocol that may be used for communications between computing devices. As an example, the communication interface 124 may be configured to be configured receive and/or transmit data from/to the tag reader 104 via the communication link 106.

In some example embodiments, the detection apparatus 102 may include a user interface 126. However, in other embodiments, such as some example embodiments in which the detection apparatus 102 is embodied as a server or embedded device, some aspects of the user interface 126 may be limited, or the user interface 126 may be omitted altogether. The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. The user interface 126 may be in communication with the memory 122, communication interface 124, and/or detection unit 128, such as via a bus.

The detection unit 128 may be embodied as various means, such as circuitry, hardware, a computer program product comprising a computer readable medium (e.g., the memory 122) storing computer readable program instructions executed by a processing device (e.g., the processor 120), or some combination thereof and, in some example embodiments, is embodied as or otherwise controlled by the processor 120. In embodiments wherein the detection unit 128 is embodied separately from the processor 120, the detection unit 128 may be in communication with the processor 120. The detection unit 128 may further be in communication with one or more of the memory 122, communication interface 124, or user interface 126, such as via a bus.

Figure 3A:
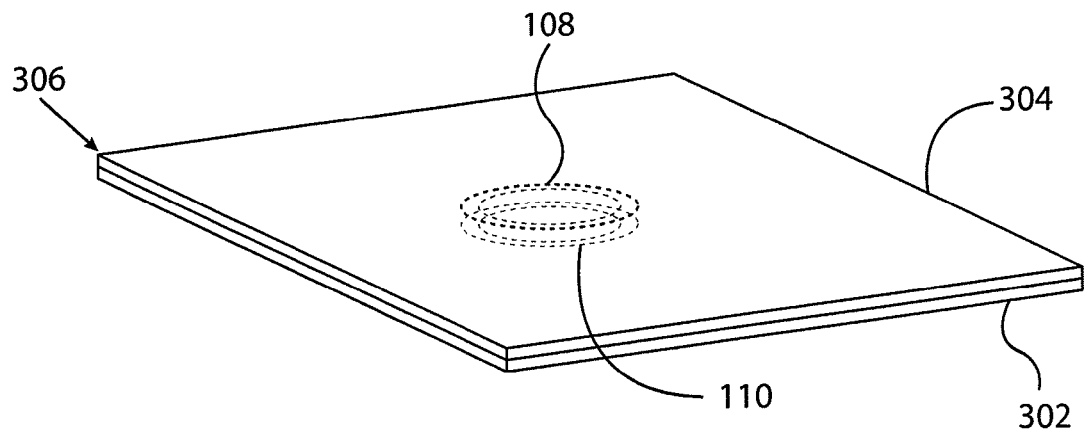
FIGS. 3A and 3B illustrate an example system for facilitating detection of an object being accessed according to some example embodiments.
Figure 3B:
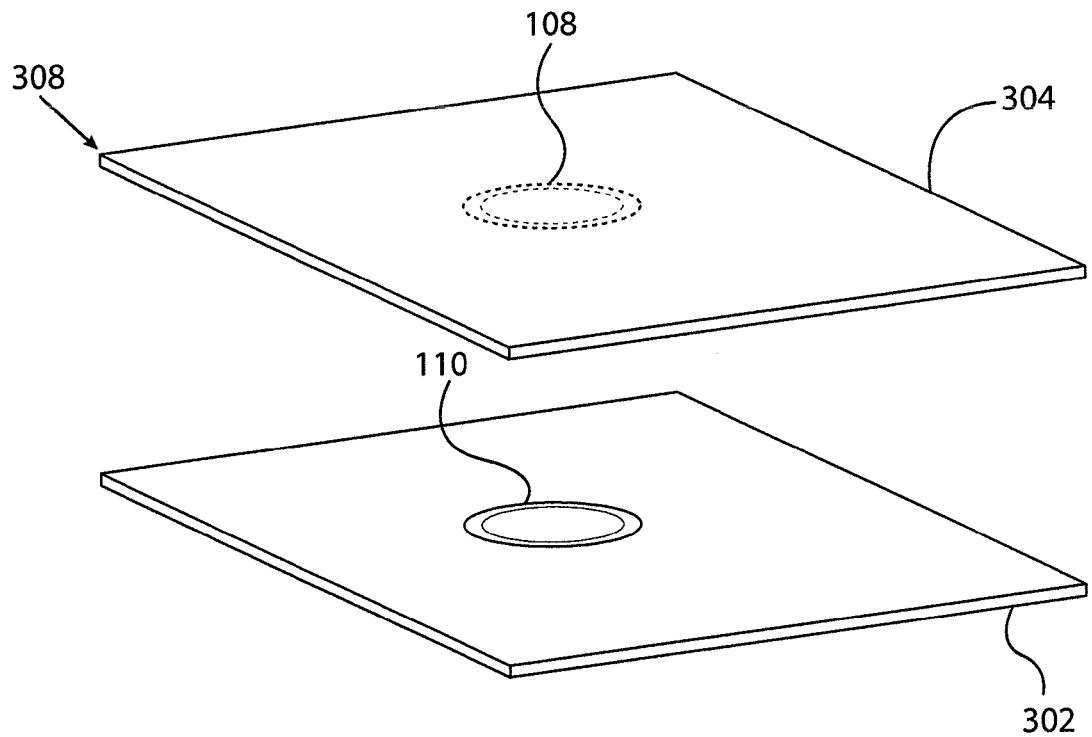

FIGS. 3A and 3B illustrate an example system 300 that may be used with the system 100 to facilitate detection of an object being accessed according to some example embodiments. In some example embodiments, the first signaling tag 108 may be carried by a first surface 302 and the second signaling tag 110 may be carried by a second surface 304. While the surfaces 302 and 304 are illustrated in FIGS. 3A and 3B as being substantially planar, it will be appreciated that the signaling tags 108 and 110 may be carried by any type of surface, including non-planar surfaces. In some example embodiments, a signaling tag may be carried by a surface through attachment to a face of a surface. As another example, in some example embodiments, a signaling tag may be carried by a surface through integration of the signaling tag into the surface. In some example embodiments, the first surface 302 and/or second surface 304 may comprise a surface of an object, access of which may be detected in accordance with one or more example embodiments.

The first signaling tag 108 may be positioned on the first surface 302 and the second signaling tag 110 may be positioned on the second surface 304 such that when the second surface 304 is in the first position 306 illustrated in FIG. 3A, the first signaling tag 108 and the second signaling tag 110 are sufficiently proximate to each other such that a coupling occurs between the first signaling tag 108 and the second signaling tag 110 resulting in a first signal state being emitted by at least one of the first signaling tag 108 or the second signaling tag 110. If the second surface 304 is transitioned to a position, such as the second position 308 illustrated in FIG. 3B, in which the first signaling tag 108 and second signaling tag 110 are no longer sufficiently proximate to each other to result in a coupling between the first signaling tag 108 and the second signaling tag 110, a decoupling between the first signaling tag 108 and the second signaling 110 tag may result in a second signal state being emitted by at least one of the first signaling tag 108 or the second signaling tag 110. Transitioning of the second surface 304 from the first position 306 to the second position 308 may, for example, result from human manipulation, machine manipulation, and/or any other force which may result in transition of the second surface 304 from the first position 306 to the second position 308.

Accordingly, when the second surface 304 is transitioned from the first position 306 to the second position 308, a change in state of a signal emitted by one or more of the first signaling tag 108 or the second signaling tag 110 may result. As a signal emitted by the first signaling tag 108 and/or second signaling tag 110 may be read by the tag reader 104, the detection unit 128 may be configured to detect the change in state based at least in part on the indication of a read state received from the tag reader 104.

It will be appreciated that a change in state resulting from transition of the surface 304 from first position 306 to second position 308 may comprise any of a variety of changes in state. For example, in some example embodiments wherein both the first signaling tag 108 and the second signaling tag 110 comprise RF tags, when the second surface 304 is in the first position 306 such that the signaling tags 108 and 110 are within sufficient proximity of each other to couple, an antenna(s) of one or more of the first signaling tag 108 or the second signaling tag 110 may be detuned such that the antenna does not emit a readable or otherwise detectable signal. However, when the second surface 304 is transitioned to the second position 308 such that the signaling tags 108 and 110 decouple, the detuned antenna(s) may become tuned and emit a readable signal. Accordingly, in some embodiments, the signal state change comprises emission of a readable signal from a signaling tag that was not previously emitting a readable signal.

In another example, in some example embodiments in which both the first signaling tag 108 and the second signaling tag 110 comprise RF tags, when the second surface 304 is in the first position 306 such that the signaling tags 108 and 110 are within sufficient proximity of each other to couple, the coupling may cause an antenna(s) of one or more of the first signaling tag 108 or the second signaling tag 110 to emit a readable or otherwise detectable signal. However, when the second surface 304 is transitioned to the second position 308 such that the signaling tags 108 and 110 decouple, the antenna(s) may become detuned such that a readable signal is no longer emitted. Accordingly, in some embodiments, the signal state change comprises cessation of emission of a readable signal from a signaling tag that was previously emitting a readable signal.

In yet another example, the signaling tags 108 and 110 may each comprise a primary antenna and a secondary antenna. The primary antennas may be configured to emit a readable or otherwise detectable signal when the second surface 304 is in the first position 306 such that the signaling tags 108 and 110 are within sufficient proximity to couple, while the secondary antennas may be detuned so that the secondary antennas do not emit a readable signal. However, when the second surface 304 is transitioned to the second position 308 such that the signaling tags 108 and 110 decouple, the secondary antennas may be activated and emit a readable signal. Accordingly, in some embodiments, the signal state change comprises emission of a second or new readable signal from one or more of the first signaling tag 108 or the second signaling tag 110. The new emitted signal may be in addition to that initially emitted by the primary antennas or in lieu of the initial signal emitted by the primary antennas when the second surface 304 was in the first position 306.

In still a further example, the signaling tag 108 and/or signaling tag 110 may be configured to emit a signal having a first communication field and/or a first frequency when the second surface 304 is in the first position 306 and the signaling tags 108 and 110 are within sufficient proximity to couple with each other. When the second surface 304 is transitioned to the second position 308 such that the signaling tags 108 and 110 decouple, the signaling tag 108 and/or signaling tag 110 may be configured to emit a signal having a second communication field and/or a second frequency. The tag reader 104 and/or detection unit 128 may be configured to differentiate between the first and second communication fields/frequencies. In some embodiments, the first communication field may comprise a near-field UHF signal that has different characteristics and properties from the second communication field, which may comprise a far-field UHF signal. In other embodiments, the second frequency may comprise a near-field UHF signal and the first frequency may comprise a far-field UHF signal. Accordingly, in some example embodiments, the change in state may comprise a change from a first communication field/frequency to a second communication field/frequency In yet another example, decoupling of the signaling tags 108 and 110 may result in one or more of the signaling tag 108 or the signaling tag 110 varying the amplitude (e.g., increasing the amplitude, decreasing the amplitude, or the like) of an emitted signal such that the tag reader 104 and/or detection unit 128 may detect the amplitude variation when the surface 304 is transitioned to the second position 308.

It will be appreciated that the above described example changes in signal state are merely examples of some example embodiments. In this regard, embodiments may utilize any measurable change in signal state triggered when the second surface 304 is transitioned to the second position 308 such that the first signaling tag 108 and the second signaling tag 110 decouple.

In some example embodiments, the detection unit 128 may be configured to determine, in response to the detected change in state, that an object associated with one or more of the first signaling tag 108 or the second signaling tag 110 has been accessed. For example, in some embodiments, a signal emitted by one or more of the first signaling tag 108 or the second signaling tag 110 may carry a unique code or other signaling tag identifier that identifies the particular signaling tag. This signaling tag identifier may be read by the tag reader 104 and may be interpreted by the detection unit 128. The signaling tag identifier may be associated with a particular object. Information may be stored, such as in a database, in the memory 122 correlating signaling tag identifiers for one or more signaling tags to associated objects. The detection unit 128 may accordingly be configured in some example embodiments to retrieve information associated with a particular signaling tag by determining the signaling tag identifier from a detected signal read by the tag reader 104 and looking up the signaling tag identifier to retrieve the information associated with the signaling tag, which may be used to identify an object that has been accessed.

The detection unit 128 may be further configured to log an entry in a database or other record reflecting that the object has been accessed. Accordingly, an object may be tracked, such as for purposes of inventory management, enforcing privileged access restrictions, and/or the like.

In some example embodiments, an accessed object may comprise and/or may be associated with a particular item. For example, in some example embodiments, such as that illustrated in FIGS. 4A and 4B, an object may comprise a receptacle in which one or more items may be maintained. It will be appreciated that an item associated with an accessed object may comprise any type of item for which it may be desirable to track access to the item, such as for inventory purposes, enforcing privileged access restrictions, and/or the like. For example, the item may comprise a health care item, such as a medical supply, drug, and/or the like.

In some example embodiments, the first signaling tag 108 and second signaling tag 110 may each emit a signal indicative of a unique identifier associated with the tags. Accordingly, the first signaling tag 108 may be configured to emit a signal indicative of a first identifier that identifies the first signaling tag 108, and the second signaling tag 110 may be configured to emit a signal indicative of a second identifier that identifies the second signaling tag 110. In some such example embodiments, if there is a change in state of only one of the first signaling tag 108 or the second signaling tag 110, in an instance in which the second surface 304 is transitioned to the second position 308, the detection unit 128 may be configured to determine that the signaling tag for which a change in state is not detected is defective. Accordingly, such example embodiments may be used to identify potentially defective signaling tags so that they may be replaced. It will be appreciated, however, that in other example embodiments, the first signaling tag 108 and second signaling tag 110 may be configured to emit signals conveying identical or otherwise non-unique identifiers.

Figure 4A:
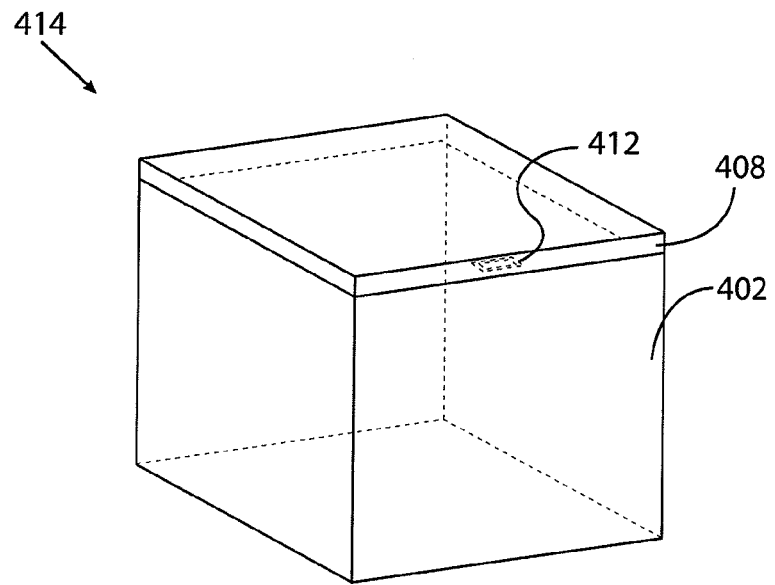
FIGS. 4A and 4B illustrate another example system for facilitating detection of an object being accessed according to some example embodiments.
Figure 4B:
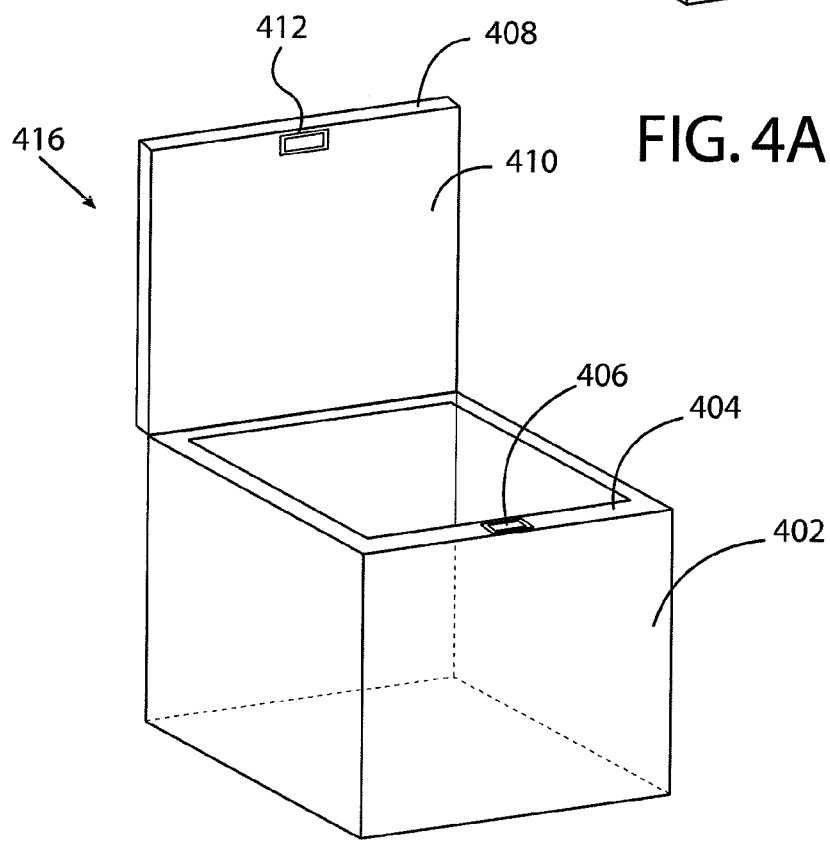

FIGS. 4A and 4B illustrate another example system for facilitating detection of an object being accessed according to some example embodiments. In this regard, FIGS. 4A and 4B illustrate an example embodiment in which the object comprises a receptacle 402. While illustrated as a box in FIGS. 4A and 4B, it will be appreciated that the receptacle 402 may take on any form having an interior portion that is configured to serve as a receptacle for (e.g., contain) one or more items. The receptacle 402 may comprise a surface 404, which may carry a signaling tag 406. The surface 404 and signaling tag 406 may correspond to some embodiments of the first surface 302 and first signaling tag 108, respectively.

The embodiments illustrated in FIGS. 4A and 4B may further comprise a closure 408 for the receptacle 402. While illustrated in FIGS. 4A and 4B as a hinged lid, it will be appreciated that the closure 408 may take any of a variety of forms that may be used to close or otherwise limit access to the interior portion of the receptacle 402. Accordingly, the form of the closure 408 may depend at least in part on the form of the receptacle 402. By way of non-limiting example, the closure 408 may comprise a non-hinged lid, a cover, a cap, plug, and/or other type of closure that may restrict access to the interior portion of the receptacle 402 when the closure 408 is in a closed position, such as the closed position 414 illustrated in FIG. 4A. The closure 408 may comprise a surface 410, which may carry a signaling tag 412. The surface 410 and signaling tag 412 may correspond to some embodiments of the second surface 304 and second signaling tag 110, respectively.

When the closure 408 is in the closed position 414, the signaling tag 406 and signaling tag 412 may be positioned on the surfaces 404 and 410, respectively, such that the signaling tags 406 and 412 couple. When the closure 408 is transitioned from the closed position 414 to an open position, such as the open position 416 illustrated in FIG. 4B, the signaling tags 406 and 412 may decouple such that a detectable change in state of a signal emitted by one or more of the signaling tag 406 or the signaling tag 412 may result. Accordingly, in such example embodiments, the detection unit 128 may be configured to detect the change in state and, in response to the change in state, determine that the receptacle 402 has been accessed.

In some such example embodiments, the detection unit 128 may be configured to further determine that an item has been added to the receptacle 402 and/or that an item has been removed from the receptacle 402 in response to a detected change in state. For example, if the receptacle 402 is associated with storage of a particular healthcare item, the detection unit 128 may be configured to determine based at least in part on detection of the change in state that the associated healthcare item has been removed from and/or added to the receptacle 402.

Figure 5A:
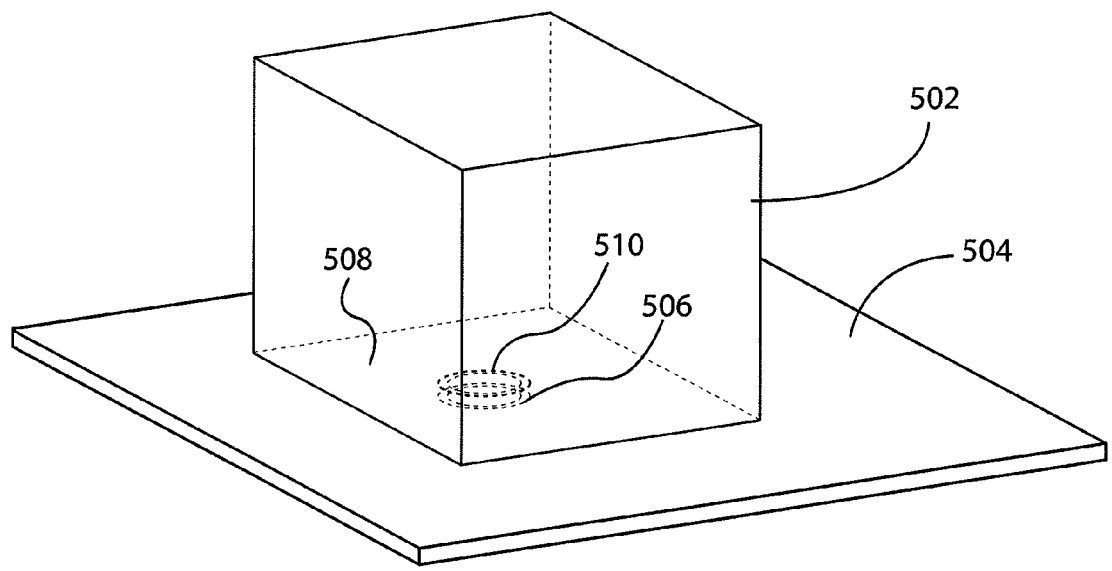
FIGS. 5A and 5B illustrate a further example system for facilitating detection of an object being accessed according to some example embodiments.
Figure 5B:
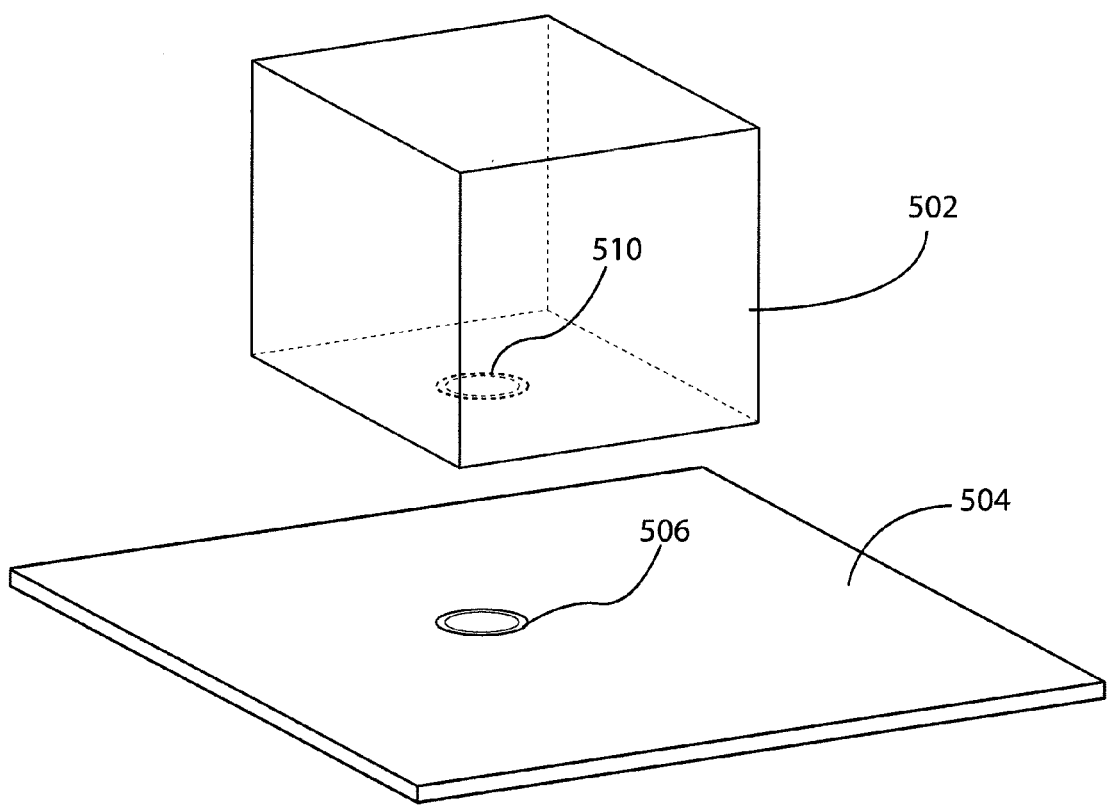

FIGS. 5A and 5B illustrate a further example system for facilitating detection of an object being accessed according to some example embodiments. In the example of FIG. 5A, an object 502 is illustrated as resting on a surface 504. The surface 504 may carry a signaling tag 506. The surface 504 and signaling tag 506 may correspond to some embodiments of the first surface 302 and first signaling tag 108, respectively. The object 502 may comprise a surface 508, which may carry a signaling tag 510. The surface 508 and signaling tag 510 may correspond to some embodiments of the second surface 304 and second signaling tag 110, respectively.

When the object 502 is resting on the surface 504 in the position illustrated in FIG. 5A, the signaling tags 506 and 510 may be positioned on the surfaces 504 and 508, respectively, such that the signaling tags 506 and 510 couple. When the object 502 is transitioned from the position illustrated in FIG. 5A to the position illustrated in FIG. 5B such that the object 502 is no longer resting on the surface 504, the signaling tags 506 and 510 may decouple such that a detectable change in state of a signal emitted by one or more of the signaling tag 506 or the signaling tag 510 may result. Accordingly, in such example embodiments, if the object 502 is accessed and removed from the surface 504, removal of the object 502 from the surface 504 may be detected by the detection unit 128.

Figure 6A:
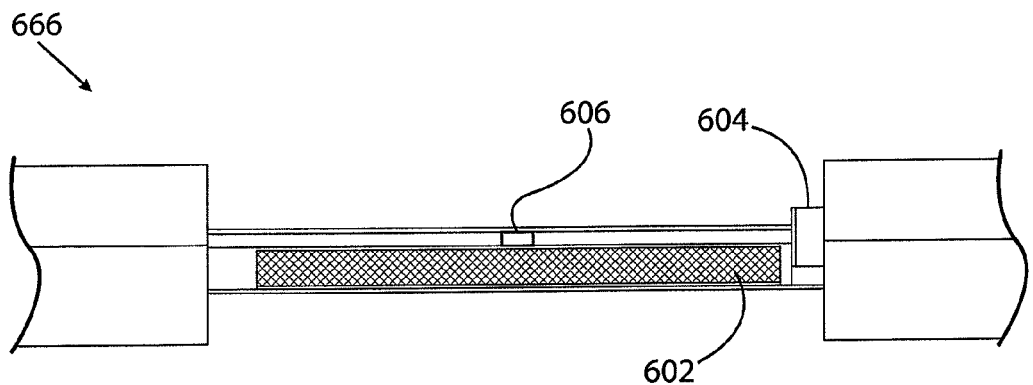
FIGS. 6A-6C illustrate an example system for facilitating detection of an object being accessed along a conveyor system according to some example embodiments.
Figure 6B:
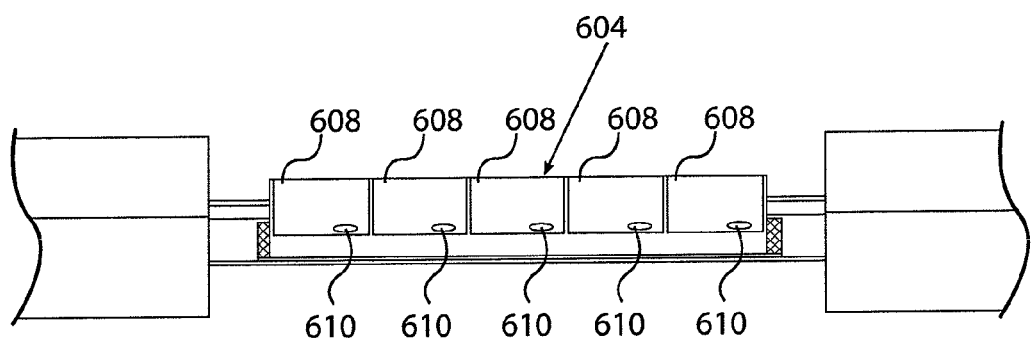
Figure 6C:
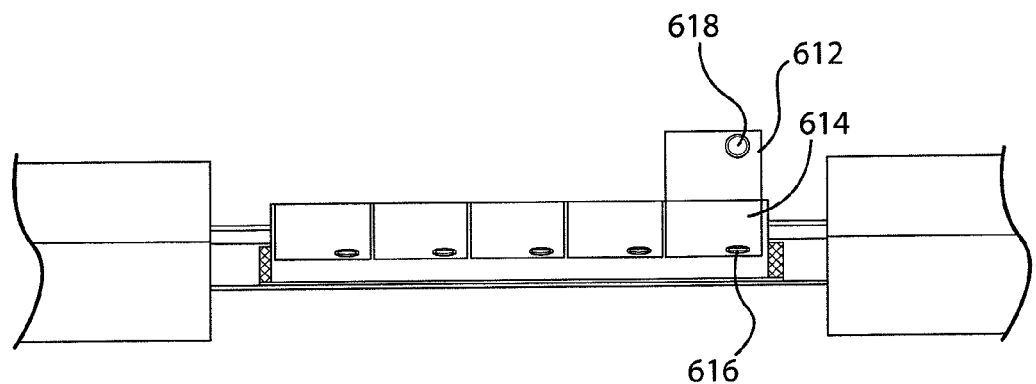

FIGS. 6A-6C illustrate an example system for facilitating detection of an object being accessed along a conveyor system according to some example embodiments. Referring first to FIG. 6A, a conveyor system 600 is illustrated. The conveyor system 600 may include a conveyor 602 that may be configured to transport an object 604, which may comprise a bin, tray, or other object comprising one or more receptacles through the conveyor system 600. While illustrated in the examples of FIGS. 6A-6C as a belt conveyor, it will be appreciated that any type of conveying mechanism that may transport the object 604 may be substituted for the belt conveyor in other example embodiments. The conveyor system may include one or more stations. A station may comprise a location along the conveyor system at which the object 604 may be accessed. A tag reader 606 may be positioned at a station along the conveyor system. The tag reader 606 may correspond to an embodiment of the tag reader 104, and may be coupled to a detection apparatus 102 via a communication link 106.

Referring to FIG. 6B, the object 604 may be stopped at the station, such as within proximity of the tag reader 606. In the example illustrated in FIGS. 6A-6C, the object 604 may comprise a tray comprising a plurality of bins 608. Each bin 608 may have an interior receptacle portion for containing one or more items and a closure, such as a hinged lid. In FIG. 6B, the closure of each bin 608 is in a closed position. Each bin 608 may include a set of signaling tags 610. The set of signaling tags 610 may correspond to a set including an embodiment of a first signaling tag 108 and a second signaling tag 110. When the bins 608 are in the closed position illustrated in FIG. 6B, the signaling tags in the signaling tag sets 610 may couple. However, as illustrated in FIG. 6C, if a closure 612 of a receptacle portion 614 of one of the bins 608 is opened, a signaling tag 616 that may be carried by a surface of the receptacle portion 614 and a signaling tag 618 that may be carried by a surface of the closure 612 may decouple. The decoupling may result in a change in state of a signal that may be emitted by one or more of the signaling tag 616 or the signaling tag 618. This change in state may be detected by the detection unit 128 via an indication that may be received from the tag reader 606 such that access to a bin 608 at the station may be detected.

Figure 7A:
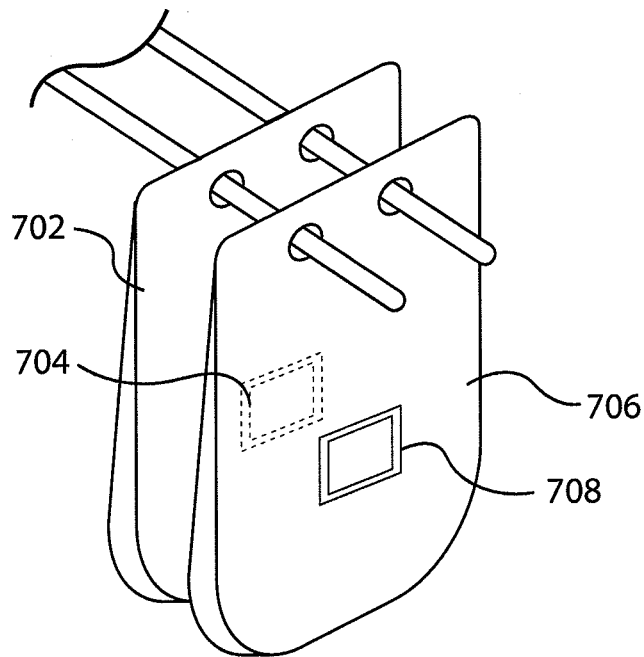
FIGS. 7A-7B illustrate an example system for facilitating detection of a hanging bag being accessed from a rack of two or more hanging bags according to some example embodiments.
Figure 7B:
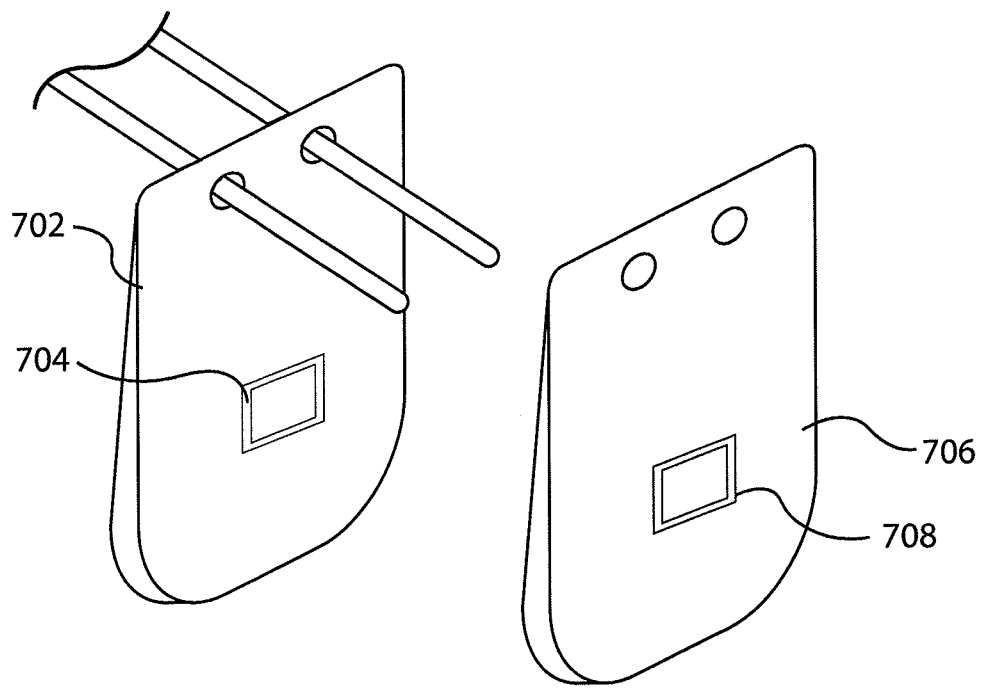

FIGS. 7A-7B illustrate an example system for facilitating detection of a hanging bag being accessed from a rack of two or more hanging bags according to some example embodiments. In this example, two or more bags or other containers may be hung from a rod or other hanging device. The bags may contain items, such as medication (e.g., vials, blister packs of medication, fluid, and/or the like). In the example of FIGS. 7A and 7B, a first bag 702 may carry a signaling tag 704 on a surface of the first bag 702. A second bag 706 may carry a signaling tag 708 on a surface of the second bag 706. When the first bag 702 and second bag 706 are positioned adjacent to each other on the hanging rod, as illustrated in FIG. 7A, the signaling tags 704 and 708 may couple. However, when the second bag 706 is transitioned to a position farther from the first bag 702, such as in FIG. 7B in which the second bag 706 has been removed from the hanging rod, the signaling tags 704 and 708 may decouple such that a detectable change in state of a signal emitted by one or more of the signaling tag 704 or the signaling tag 708 may result. Accordingly, in such example embodiments, if a bag, such as the second bag 706, is removed from the hanging rod, removal of the bag may be detected by the detection unit 128.

Figure 8:
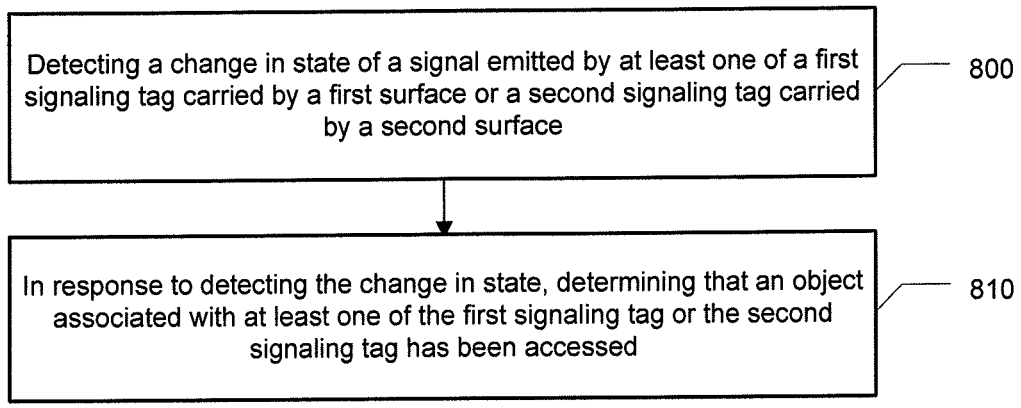
FIG. 8 is a flowchart according to an example method for detecting that an object has been accessed according to some example embodiments.

FIG. 8 illustrates a flowchart according to an example method for detecting that an object has been accessed according to some example embodiments. In this regard, FIG. 8 illustrates a method that may be at least partially performed by a detection apparatus 102. The operations illustrated in and described with respect to FIG. 8 may, for example, be performed by, with the assistance of, and/or under the control of one or more of the processor 120, memory 122, communication interface 124, user interface 126, or detection unit 128. Operation 800 may comprise detecting a change in state of a signal emitted by at least one of a first signaling tag carried by a first surface or a second signaling tag carried by a second surface. Detection may, for example, be based at least in part on an indication received from a tag reader 104. The processor 120, memory 122, communication interface 124, and/or detection unit 128 may, for example, provide means for performing operation 800. Operation 810 may comprise, responsive to detecting the change in state, determining that an object associated with at least one of the first signaling tag or the second signaling tag has been accessed. The processor 120, memory 122, communication interface 124, and/or detection unit 128 may, for example, provide means for performing operation 810.

FIG. 8 illustrates a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., a detection apparatus 102) and executed by a processor (e.g., the processor 120) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowchart support combinations of means for performing the specified functions and combinations of steps for performing the specified functions. It will also be understood that one or more blocks of the flowcharts, and combinations of blocks in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for detecting that an object has been accessed, the method comprising:

detecting a change in state of a signal emitted by at least one of a first signaling tag carried by a first surface or a second signaling tag carried by a second surface, the change in state resulting from the second surface being transitioned from a first position to a second position, wherein the first signaling tag is positioned on the first surface and the second signaling tag is positioned on the second surface such that when the second surface is in the first position, the first signaling tag and the second signaling tag are sufficiently proximate to each other such that a coupling occurs between the first signaling tag and the second signaling tag, whereby an antenna of at least one of the first signaling tag or the second signaling tag is at least partially detuned by the coupling, thereby resulting in a first signal state being emitted by at least one of the first signaling tag or the second signaling tag, and wherein when the second surface is transitioned from the first position to the second position, wherein transitioning from the first position to the second position increases the distance between the first signaling tag and the second signaling tag such that a decoupling between the first signaling tag and the second signaling tag results in the antenna of at least one of the first signaling tag or the second signaling tag no longer being at least partially detuned, thereby resulting in a second signal state being emitted by at least one of the first signaling tag or the second signaling tag; and in response to detecting the change in state, determining, by a processor, that an object associated with at least one of the first signaling tag or the second signaling tag has been accessed.

2. The method of claim 1, further comprising:

logging an entry in a database reflecting that the object has been accessed.

3. The method of claim 1, wherein the object comprises a receptacle in which a healthcare item is stored, the method further comprising determining, in response to detecting the change in state, that the healthcare item has been accessed.

4. The method of claim 1, wherein the object comprises a receptacle, the method further comprising determining, in response to detecting the change in state, one of that an item has been added to the receptacle or that an item has been removed from the receptacle.

5. The method of claim 1, wherein detecting the change in state comprises detecting the change in state based at least in part on an indication received from a tag reader positioned at a station along a conveyor system used to move the object, the tag reader being configured to read a signal emitted by one or more of the first signaling tag or the second signaling tag.

6. The method of claim 1, wherein in an instance in which a change in state is detected for only one of the first signaling tag or the second signaling tag, the method further comprises:
   determining that the one of the first signaling tag or the second signaling tag for which a change in state is not detected is defective.

7. The method of claim 1, wherein the first surface comprises a surface of a receptacle, and wherein the second surface comprises a surface of a closure for the receptacle.

8. The method of claim 1, wherein the change in state comprises emission of a readable signal from at least one of the first signaling tag or the second signaling tag, wherein the at least one of the first signaling tag or the second signaling tag did not emit a readable signal in the first signal state.

9. The method of claim 1, wherein the change in state comprises a cessation of emission of a readable signal by at least one of the first signaling tag or the second signaling tag.

10. The method of claim 1, wherein the change in state comprises emission of a signal having a different frequency than a signal emitted in the first signal state.

11. The method of claim 1, wherein the change in state comprises emission of a signal having a different communication field than a signal emitted in the first signal state.

12. The method of claim 1, wherein the change in state comprises emission of a signal having a different amplitude than a signal emitted in the first signal state.

13. An apparatus for detecting that an object has been accessed, the apparatus comprising at least one processor, wherein the at least one processor is configured to cause the apparatus to at least:
   detect a change in state of a signal emitted by at least one of a first signaling tag carried by a first surface or a second signaling tag carried by a second surface, the change in state resulting from the second surface being transitioned from a first position to a second position, wherein the first signaling tag is positioned on the first surface and the second signaling tag is positioned on the second surface such that when the second surface is in the first position, the first signaling tag and the second signaling tag are sufficiently proximate to each other such that a coupling occurs between the first signaling tag and the second signaling tag, whereby an antenna of at least one of the first signaling tag or the second signaling tag is at least partially detuned by the coupling, thereby resulting in a first signal state being emitted by at least one of the first signaling tag or the second signaling tag, and wherein when the second surface is transitioned from the first position to the second position, wherein transitioning from the first position to the second position increases the distance between the first signaling tag and the second signaling tag such that a decoupling between the first signaling tag and the second signaling tag results in the antenna of at least one of the first signaling tag or the second signaling tag no longer being at least partially detuned, thereby resulting in a second signal state being emitted by at least one of the first signaling tag or the second signaling tag; and
   in response to detecting the change in state, determine that an object associated with at least one of the first signaling tag or the second signaling tag has been accessed.

14. The apparatus of claim 13, wherein the object comprises a receptacle in which a healthcare item is stored, and wherein the at least one processor is further configured to cause the apparatus to determine, in response to detecting the change in state, that the healthcare item has been accessed.

15. The apparatus of claim 13, wherein the object comprises a receptacle, and wherein the at least one processor is further configured to cause the apparatus to determine, in response to detecting the change in state, one of that an item has been added to the receptacle or that an item has been removed from the receptacle.

16. The apparatus of claim 13, wherein the apparatus is coupled to a tag reader positioned at a station along a conveyor system used to move the object, the tag reader being configured to read a signal emitted by one or more of the first signaling tag or the second signaling tag, and wherein the at least one processor is further configured to cause the apparatus to detect the change in state based at least in part on an indication received from the tag reader.

17. The apparatus of claim 13, wherein the first surface comprises a surface of a receptacle, and wherein the second surface comprises a surface of a closure for the receptacle.

18. A system for facilitating detection of an object being accessed, the system comprising:
   a first surface;
   a second surface;
   a first signaling tag carried by the first surface; and
   a second signaling tag carried by the second surface;
   wherein the first signaling tag is positioned on the first surface and the second signaling tag is positioned on the second surface such that when the second surface is in a first position, the first signaling tag and the second signaling tag are sufficiently proximate to each other such that a coupling occurs between the first signaling tag and the second signaling tag, whereby an antenna of at least one of the first signaling tag or the second signaling tag is at least partially detuned by the coupling, thereby resulting in a first signal state being emitted by at least one of the first signaling tag or the second signaling tag; and
   wherein when the second surface is transitioned from the first position to a second position, wherein transitioning from the first position to the second position increases the distance between the first signaling tag and the second signaling tag such that a decoupling between the first signaling tag and the second signaling tag results in the antenna of at least one of the first signaling tag or the second signaling tag no longer being at least partially detuned, thereby resulting in a second signal state being emitted by at least one of the first signaling tag or the second signaling tag.

19. The system of claim 18, wherein one or more of the first surface or the second surface comprises a surface of the object.

20. The system of claim 18, wherein the object comprises a receptacle in which a healthcare item is stored.

21. The system of claim 18, wherein the first surface comprises a surface of a receptacle, and wherein the second surface comprises a surface of a closure for the receptacle.

22. The system of claim 18, wherein the second surface comprises a surface of the object, and wherein the first surface comprises a surface on which the object rests when the second surface is in the first position.

23. The system of claim 18, further comprising a tag reader configured to read a signal emitted by one or more of the first signaling tag or the second signaling tag to enable detection of a change in state of a signal emitted by at least one of the first signaling tag or the second signaling tag in an instance in which the second surface is transitioned from the first position to the second position.

* * * * *